(12) United States Patent
Mathieu et al.

(10) Patent No.: US 10,047,849 B2
(45) Date of Patent: Aug. 14, 2018

(54) METHOD FOR MANUFACTURING A PROPELLER REDUCTION GEAR

(71) Applicant: SAFRAN TRANSMISSION SYSTEMS, Colombes (FR)

(72) Inventors: Antoine Mathieu, Courbevoie (FR); Benjamin Feraud, Saint-Vincent (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 15/543,106

(22) PCT Filed: Jan. 12, 2016

(86) PCT No.: PCT/FR2016/050046
§ 371 (c)(1),
(2) Date: Jul. 12, 2017

(87) PCT Pub. No.: WO2016/113494
PCT Pub. Date: Jul. 21, 2016

(65) Prior Publication Data
US 2017/0363198 A1 Dec. 21, 2017

(30) Foreign Application Priority Data

Jan. 13, 2015 (FR) .................................. 15 50246

(51) Int. Cl.
*F16H 57/022* (2012.01)
*F16H 1/22* (2006.01)
(Continued)

(52) U.S. Cl.
CPC ............. *F16H 57/022* (2013.01); *F02C 7/36* (2013.01); *F16H 1/20* (2013.01); *F16H 1/22* (2013.01);
(Continued)

(58) Field of Classification Search
CPC ........ F16H 57/022; F16H 57/023; F16H 1/20; F16H 1/22; F16H 37/0833;
(Continued)

(56) References Cited

U.S. PATENT DOCUMENTS 5,472,386 A * 12/1995 Kish ....................... B64C 27/14
244/60
6,264,138 B1 * 7/2001 Hawkins ................ B64D 35/00
244/60

FOREIGN PATENT DOCUMENTS

WO    WO 95/32895 A1    12/1995
WO    WO 00/17540 A2    3/2000
WO    WO 2004/033937 A1    4/2004

OTHER PUBLICATIONS

International Preliminary Report on Patentability and the Written Opinion of the International Searching Authority as issued in International Patent Application No. PCT/FR2016/050046, dated Jul. 18, 2017.

(Continued)

*Primary Examiner* — Sarang Afzali
(74) *Attorney, Agent, or Firm* — Pillsbury Winthrop Shaw Pittman LLP

(57) ABSTRACT

A method for manufacturing a propeller reduction gear, which includes measuring manufacturing defects of the casing; calculating a first angular play induced at each intermediate gear by the measured manufacturing defects; estimating a second angular play induced at each intermediate gear by deformations of the casing when the reduction gear transmits a threshold torque; calculating a total angular play from the first angular play and the second angular play; and selecting two intermediate gears with a phase difference that compensates for the total angular play.

4 Claims, 7 Drawing Sheets

(51) Int. Cl.
*F16H 57/023* (2012.01)
*F02C 7/36* (2006.01)
*F16H 1/20* (2006.01)
*F16H 37/08* (2006.01)

(52) U.S. Cl.
CPC ....... *F16H 37/0833* (2013.01); *F16H 57/023* (2013.01); *F05D 2230/60* (2013.01); *F16H 2057/0227* (2013.01); *Y10T 29/49696* (2015.01); *Y10T 29/49771* (2015.01); *Y10T 74/19023* (2015.01); *Y10T 74/19084* (2015.01)

(58) Field of Classification Search
CPC .. F16H 2057/022; F02C 7/36; F05D 2230/60; Y10T 29/49696; Y10T 29/49771; Y10T 74/19023; Y10T 74/19084
See application file for complete search history.

(56) References Cited

OTHER PUBLICATIONS

International Search Report as issued in International Patent Application No. PCT/FR2016/050046, dated Apr. 7, 2016.

* cited by examiner

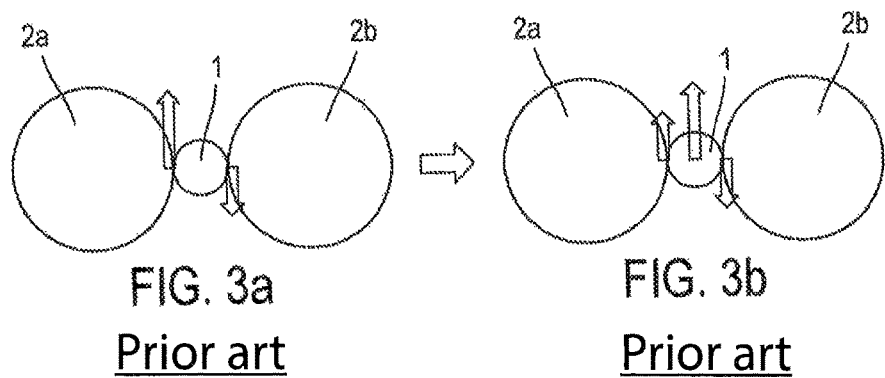
FIG. 3a
Prior art
FIG. 3b
Prior art
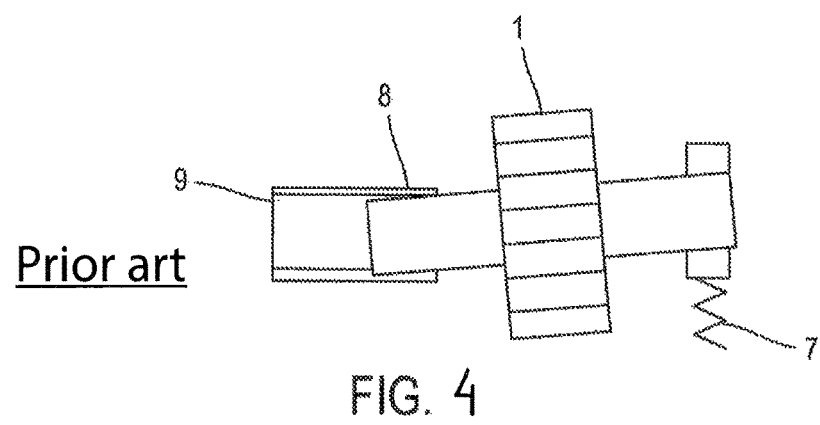
Prior art
FIG. 4

METHOD FOR MANUFACTURING A PROPELLER REDUCTION GEAR

CROSS-REFERENCE TO RELATED APPLICATIONS

This is the U.S. National Stage of PCT/FR2016/050046, filed Jan. 12, 2016, which in turn claims priority to French Patent Application No. 1550246, filed Jan. 13, 2015, the entire contents of all applications are incorporated herein by reference in their entireties.

TECHNICAL FIELD

The present invention relates to a method for manufacturing a propeller reduction gear and a propeller reduction gear obtained by this method.

STATE OF PRIOR ART

Propeller turbomachines of prior art generally include a "propeller gear box" (PGB) or "propeller reduction gear", which enables a rotational movement to be transmitted from a crankshaft, generally driven by a gas turbine, to a propeller, with a selected reduction ratio. Such a propeller reduction gear enables the propeller to be rotatably driven with a speed lower than the rotational speed of the crankshaft. Such a propeller reduction gear is for example described in document WO00/17540.

Among the different propeller reduction gears that can be used, prior art knows "compound" type reduction gears. Such a reduction gear is also called a reduction gear with intermediate transmission lines. Such a reduction gear is represented in FIG. 1. It generally includes:
- an input gear 1;
- two intermediate gears 2, each intermediate gear including a first stage 3 meshing with the input gear 1 and a second stage 4;
- an output gear wheel 5 meshing with the second stage 4 of each of the intermediate gears.

The input gear is intended to be connected to a crankshaft. The output gear wheel is intended to be connected to the propeller to be rotatably driven.

However, as represented in FIG. 2, such a propeller reduction gear is hyperstatic. Consequently, a play 6 at one of the intermediate gears 2 can cause an improper load distribution such that the other intermediate gear thereby forwards most of the engine power whereas the first intermediate gear substantially forwards no power. Yet, when the reduction gear transmits the maximum torque for which it is dimensioned, this improper torque distribution transmitted by both intermediate gears can cause damage to the propeller reduction gear and premature wear of said reduction gear.

To overcome this problem, prior art has suggested a propeller reduction gear provided with a spring system as represented in FIGS. 3a, 3b and 4. This spring system 7 includes a spring 7 attached to the input gear 1. The spring system 7 also includes a ball joint spline at the axis of the input gear and a beam 9 supported by bearings. The spring system adds a degree of freedom by enabling the input gear 1 to be vertically displaced such that both intermediate gears transmit the same power. Indeed, the spring system is dimensioned such that the input gear finds its balance position when the tangential strains exerted on either side of the input gear, and thus the torques transmitted by both intermediate gears 2, are equal. Thus, for example, when the torque transmitted by the intermediate gear 2a is higher than the torque transmitted by the intermediate gear 2b, the input gear will be upwardly displaced, as represented in FIGS. 2a and 2b, so as to equalise the torque transmitted by both intermediate gears.

This spring system is efficient, but it forces the teeth of the propeller reduction gear to work in a non-aligned manner, which damages them on the long term. Further, introducing a spring in the propeller reduction gear is detrimental to the dynamic behaviour and reliability of said propeller reduction gear.

Dynamic load distribution systems in propeller reduction gears of prior art are thus efficient, but they have a negative impact in terms of bulk, mass and complexity of the propeller reduction gears.

DISCLOSURE OF THE INVENTION

The invention aims at overcoming drawbacks of the state of the art by providing a solution enabling a proper distribution of the torque transmitted by the intermediate gears of a propeller reduction gear, which does not makes the propeller reduction gear heavier, which is not bulky and not complicated.

For this, according to a first aspect of the invention, it is provided a method for manufacturing a propeller reduction gear including:
- a casing including at least two front bearing seatings and two rear bearing seatings;
- an input gear;
- at least two intermediate gears, each intermediate gear including a first stage meshing with the input gear and a second stage, each intermediate gear being attached to the casing via at least one front bearing and one rear bearing, each front bearing being supported by one of the front bearing seatings, each rear bearing being supported by one of the rear bearing seatings;
- an output gear wheel meshing with the second stage of each of the intermediate gears;

the method including the following steps of:
(a) measuring manufacturing defects of the casing;
(b) calculating a first angular play induced at each intermediate gear from the measured manufacturing defects;
(c) estimating a second angular play induced at each intermediate gear by deformations of the casing upon transmitting a threshold torque by the reduction gear;
(d) calculating a total angular play from the first angular play and the second angular play;
(e) selecting two intermediate gears having a phasing difference compensating for this total angular play.

In this document, the terms "phasing difference" designate the relative angle between teeth of the first stage and teeth of the second stage on each intermediate gear.

In this document, the terms "angular play" designate a possible angular clearance on an intermediate gear when the other intermediate gear both contacts the input gear and the output gear wheel. The angular play can be measured by contacting the teeth on one side of the reduction gear and by measuring the possible angular clearance on the other side of the reduction gear.

The manufacturing method thus enables a propeller reduction gear to be made in which the torque transmitted by both intermediate gears is balanced, while dispensing with the load distribution systems used in prior art. For this, the method suggests to use a pairing of the intermediate gears so as to improve load distribution between both these gears. Thus, instead of using dynamic load distribution systems as in prior art, in order to balance the loads between the intermediate gears on the entire operating range of the reduction gear, the method suggests to select the intermediate gears so as to compensate for the manufacturing defects of the casing and the deformation thereof when the reduction gear transmits a threshold torque. This threshold torque is preferably the maximum torque for which the reduction gear has been dimensioned. A reduction gear is thus achieved in which the torque transmitted is fairly distributed between both intermediate gears when the reduction gear transmits a maximum torque, which limits reduction gear damage and wear risk, without making the reduction gear heavier or more complex. Further, load balancing systems of prior art provided with movable pieces, which threatened the reliability of the reduction gear can thereby be dispensed with.

The method according to the first aspect of the invention can also have one or more of the characteristics hereinafter taken independently or according to any technically possible combinations.

Advantageously, step (a) of measuring defects includes a step of measuring a real position of each bearing seating.

Advantageously, step (b) of calculating the first angular play includes the following steps of:
for each bearing seating, calculating a difference between the real position of the bearing seating and a reference position so as to obtain a bearing seating offset;
for each intermediate gear:
calculating an offset of the intermediate gear from the bearing seating offsets supporting the bearings of this intermediate gear;
calculating the first angular play from the offset of the intermediate gear.

Advantageously, step (c) of estimating the second angular play includes the following steps of:
estimating a displacement of each bearing seating upon transmitting a threshold torque by the reduction gear;
for each intermediate gear:
calculating a displacement of the first stage from the displacements of the bearing seatings supporting the bearings of this intermediate gear;
calculating a second angular play from the calculated displacements.

A second aspect of the invention relates to a propeller reduction gear obtained by the method according to the first aspect of the invention.

BRIEF DESCRIPTION OF THE FIGURES

Further characteristics and advantages of the invention will better appear upon reading the detailed description that follows, in reference to the appended figures, which illustrate:

FIGS. 3a, 3b and 4, schematic representations of a propeller reduction gear of prior art provided with a spring load distribution system;

For the sake of clarity, identical or similar elements are referred to as by identical reference signs throughout the figures.

DETAILED DESCRIPTION OF AT LEAST ONE EMBODIMENT

Figure 1:
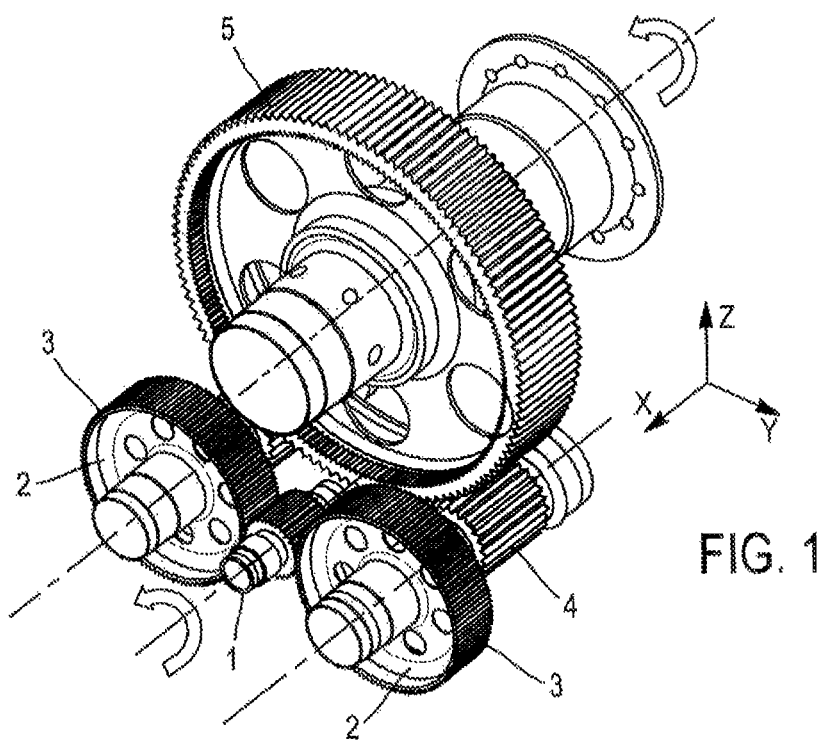
FIG. 1, a perspective view of a propeller reduction gear to which the method according to the first aspect of the invention is applied.
Figure 2:
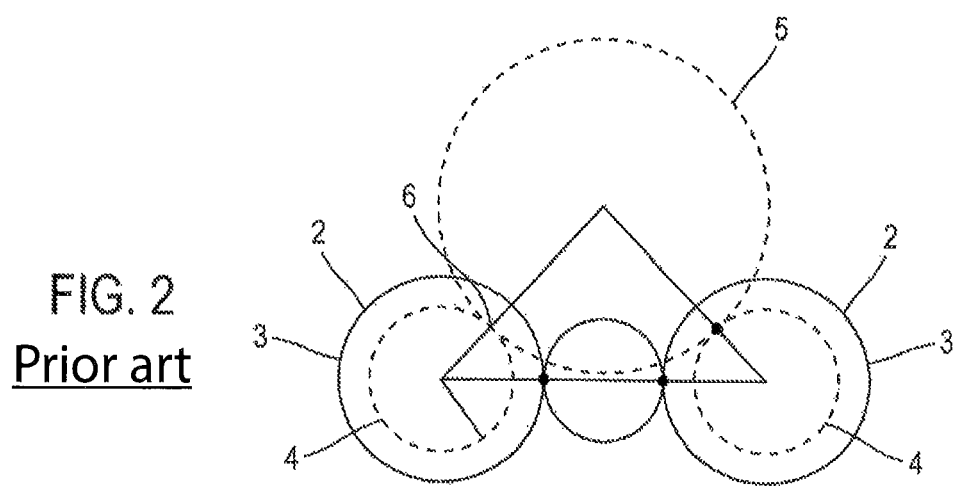
FIG. 2, a front face of a propeller reduction gear manufactured according to a manufacturing method of prior art.
Figure 5:
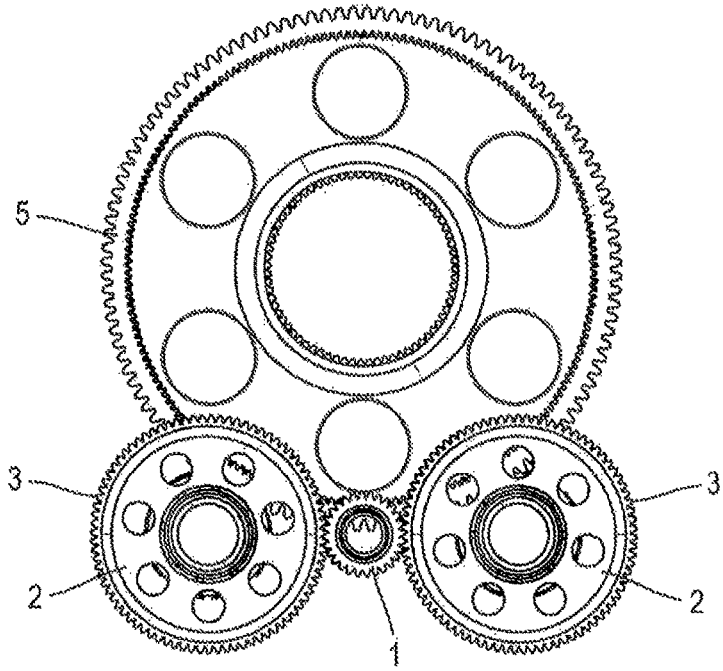
FIG. 5, a view of the face of a propeller reduction gear according to one embodiment of the invention.
Figure 6:
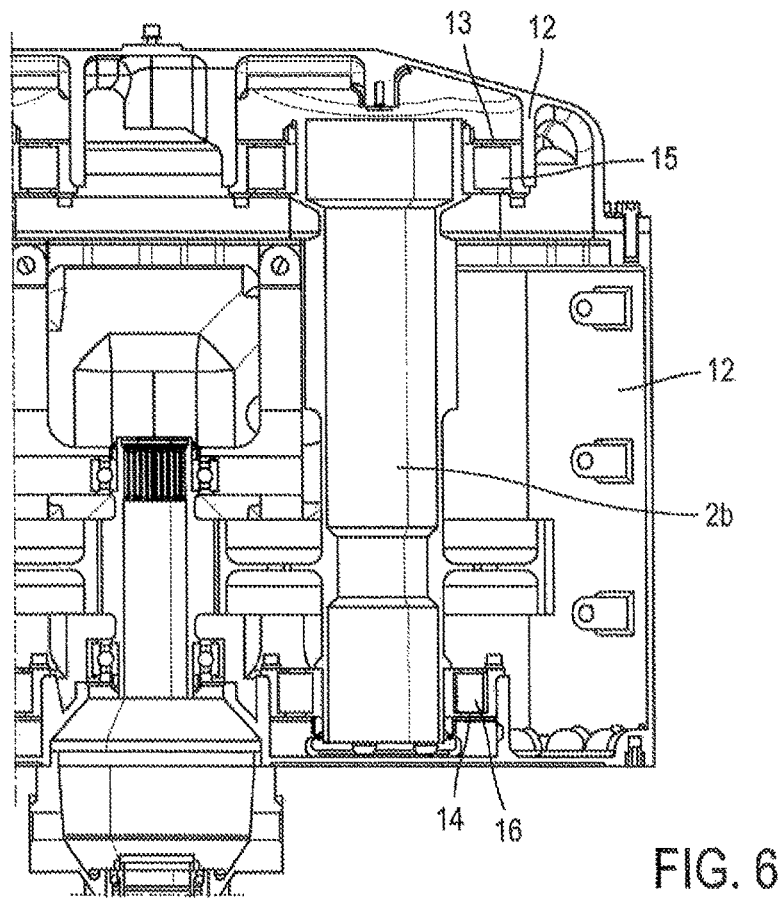
FIG. 6, a top view of a part of a propeller reduction gear according to one embodiment of the invention.

The method aims at manufacturing a propeller reduction gear as represented in the figures. This propeller reduction gear includes a casing 12. The casing 12 includes two front bearing seatings 13 and two rear bearing seatings 14. The casing 12 surrounds a gear chain enabling a propeller to be rotatably driven at a speed being different from the rotational speed of a crankshaft. For this, the gear chain includes an input gear 1 intended to be attached to a crankshaft and an output gear wheel 5 intended to be integral with a propeller to be rotatably driven. The gear chain also includes at least two intermediate gears 2. Each intermediate gear 2 includes a first stage 3 which meshes with the input gear 1 and a second stage 4 which meshes with the output gear wheel 5. Each intermediate gear is attached to the casing via:
a front bearing 15 supported by one of the front bearing seatings 13 of the casing and
a rear bearing 16 supported by one of the rear bearing seatings 14 of the casing.

A method for manufacturing such a reduction gear will now be described. It first includes a step (a) of measuring manufacturing defects of the casing. More precisely, during this step, the real position of each bearing seating is measured.

Figure 7:
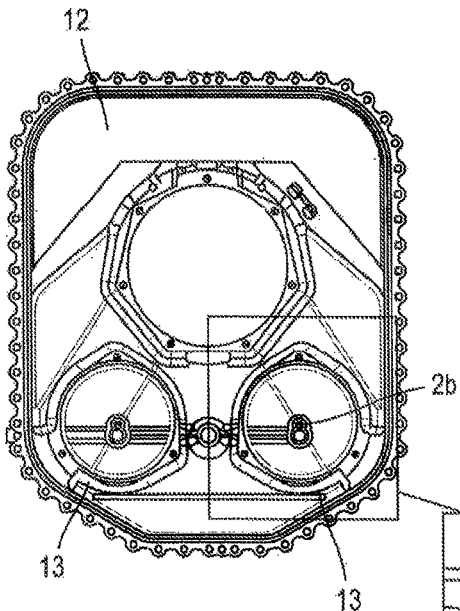
FIG. 7, a front view of the casing of the propeller reduction gear of FIG. 6.
Figure 8:
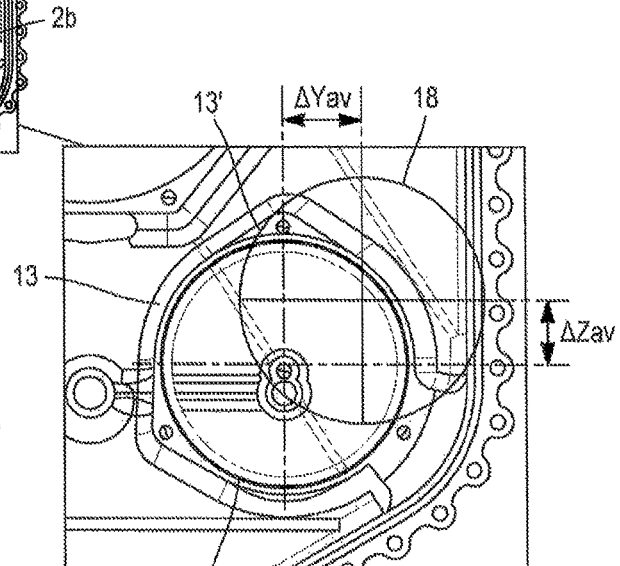
FIG. 8, an enlarged view of a part of the casing of FIG. 7.
Figure 9:
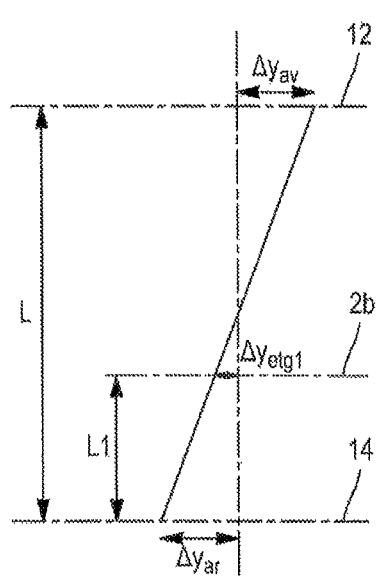
FIG. 9, a schematic representation of a method enabling the meshing offset to be calculated.
Figures 10A, 10B, 10C:
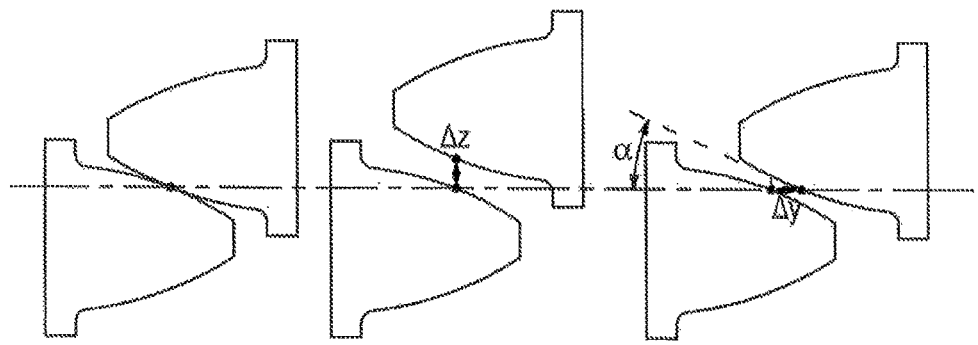
FIGS. 10a to 10c, schematic representations of the teeth of an intermediate gear used within the scope of a method according to one embodiment of the invention.

The method then includes a step of comparing the real position of each bearing seating and a reference position. Thus, in reference to FIGS. 7 and 8, the method includes a step of measuring the difference between a reference position 17 specified by the plans and the real position 18 of each bearing seating. Thus, a bearing seating offset ($\Delta Yav$, $\Delta Zav$) for each front bearing seating and ($\Delta Yar$, $\Delta Zar$) for each rear bearing seating is obtained.

Figure 13:
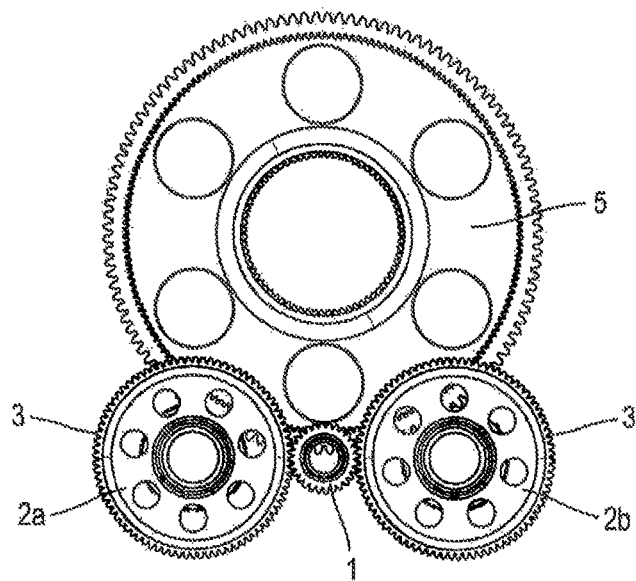
FIG. 13, a view of the first stage of the propeller reduction gear of FIG. 5.
Figure 14:
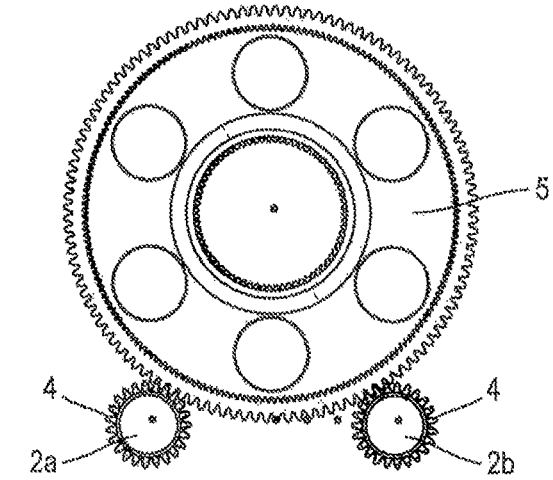
FIG. 14, a view of the second stage of the propeller reduction gear of FIG. 5.

The method then includes a step (b) of calculating a first angular play induced at each intermediate gear from the measured manufacturing defects. This step includes a step of calculating an offset of the first stage of each intermediate gear from the calculated bearing seatings. Thus, the intermediate gear 2b for example is attached to the casing through the front bearing seating 13 and through the rear bearing seating 14. In reference to FIG. 13, insofar as the front bearing seating offset 13 ($\Delta Yav$, $\Delta Zav$), the rear bearing seating offset 14 ($\Delta Yar$, $\Delta Zar$), the total length of the intermediate gear L, and the distance between the intermediate gear and one of the bearing seatings L1 are known, the offset ($\Delta Y$, $\Delta Z$) of the first stage of the intermediate gear 2b is calculated:

$$\Delta Y = \frac{\Delta Yar*(L-L1) + L1*\Delta Yav}{L}$$

$$\Delta Z = \frac{\Delta Zar*(L-L1) + L1*\Delta Zav}{L}.$$

The method then includes a step of calculating the first angular play from the offset ($\Delta Y$, $\Delta Z$) of the first stage of the intermediate gear 2b. This first angular play is given by the following equations:

$$\delta 1 = \Delta Z/r + \Delta Y * \tan(\alpha)/r$$

where r is the primitive radius of the intermediate gear in mm.

The first angular play $\delta 2$ is calculated in the same way for the other intermediate gear 2a.

The method then includes a step of calculating the first total angular play $\delta$manufacturing=$\delta 1 + \delta 2$.

Figure 11:
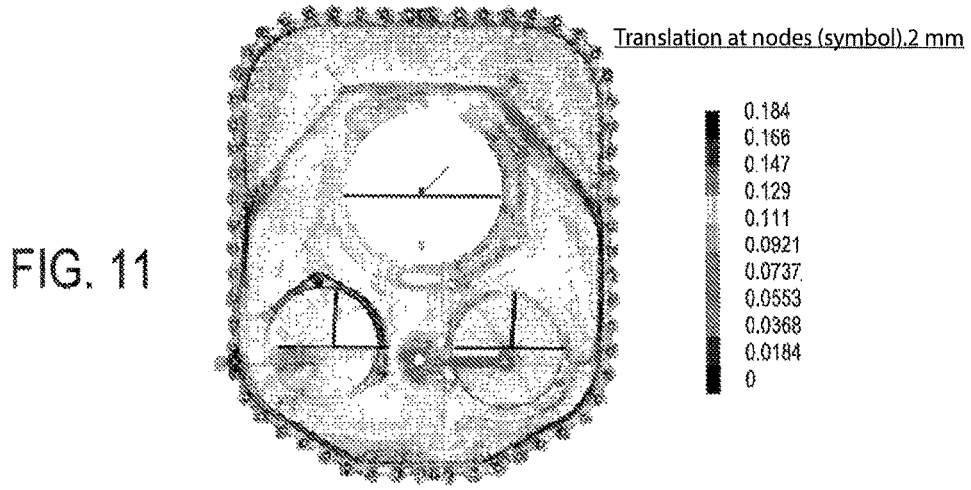
FIG. 11, a displacement field of the bearing seatings of the casing of FIG. 7 in the case of a threshold torque loading.
Figure 12:
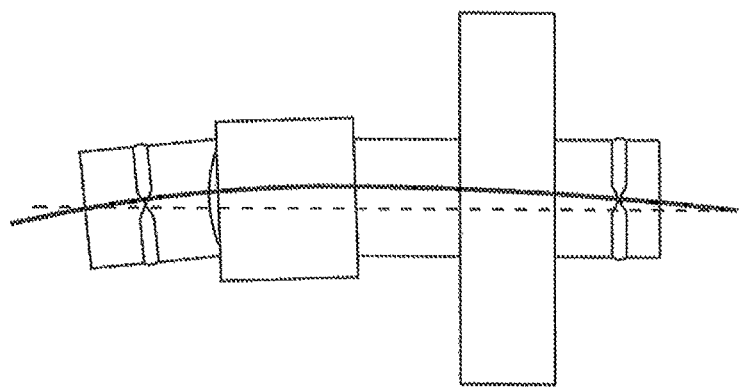
FIG. 12, a displacement field of an intermediate gear of the propeller reduction gear of FIG. 5.

The method also includes a step of estimating a second angular play induced at each intermediate gear by deformations of the casing upon transmitting a threshold torque by the reduction gear. For this, in reference to FIGS. 11 and 12, a finite element calculation can for example be performed to know the displacement of each bearing seating due to the casing deformations upon transmitting a threshold torque by the reduction gear. This threshold torque is preferably the maximum torque for which the reduction gear has been dimensioned. Thus, the displacements ($\Delta Y'av$, $\Delta Z'av$) of the rear bearing seatings are obtained.

The method then includes a step of calculating the displacement ($\Delta Y'$, $\Delta Z'$) of the first stage of the intermediate gear 2b in the case of transmission of the threshold torque:

$$\Delta Y' = \frac{\Delta Y'ar*(L-L1) + L1*\Delta Y'av}{L}$$

$$\Delta Z' = \frac{\Delta Z'ar*(L-L1) + L1*\Delta Z'av}{L}.$$

The method then includes a step of calculating the second angular play from the offset ($\Delta Y'$, $\Delta Z'$) of the first stage of the intermediate gear 2b. This second angular play is given by the following equations:

$$\delta 1' = \Delta Z'/r + \Delta Y' * \tan(\alpha)/r$$

where r is the primitive radius of the intermediate gear in mm.

The second angular play $\delta 2'$ is calculated in the same way for the other intermediate gear 2a.

The method then includes a step of calculating the second total angular play $\delta$deformation=$\delta 1' + \delta 2'$.

The method then includes a step of calculating a total angular play:

$$\delta total = \delta manufacturing + \delta deformation.$$

Figure 15:
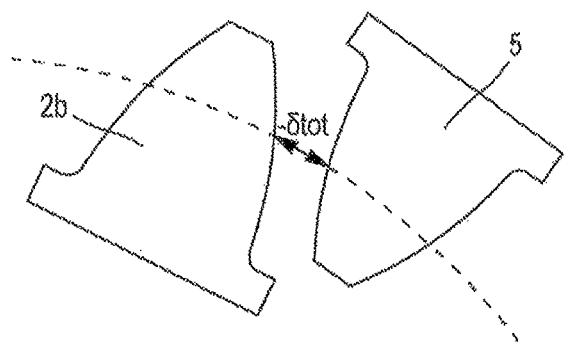
FIG. 15, a view of a tooth of an intermediate gear meshing with a tooth of the gear wheel of the propeller reduction gear of FIG. 5.

The method then includes a step of selecting a couple of intermediate gears causing a phase shift equal to $-\delta total$ as represented in FIG. 15.

Figure 16A:
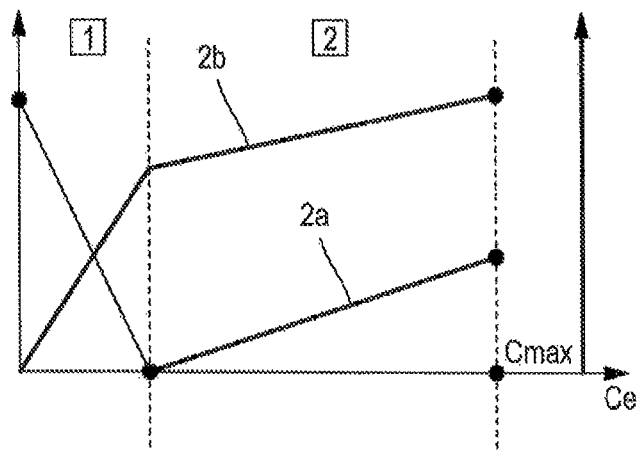
FIG. 16a, a schematic representation of the torque transmitted by each of the intermediate gears of a propeller reduction gear in the absence of use of a method according to the invention.
Figure 16B:
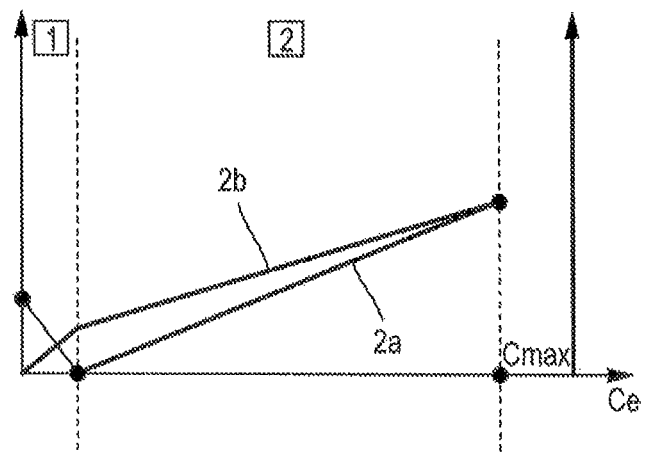
FIG. 16b, a schematic representation of the torque transmitted by each of the intermediate gears of a propeller reduction gear manufactured by a method according to one embodiment of the invention.

The method described thus enables the manufacturing and deformation defects to be compensated for by selecting a suitable couple of intermediate gears. Thus, it enables a balanced load distribution to be achieved between both intermediate gears. Thus, FIG. 16a represents the evolution of the torque transmitted by each of the intermediate gears 2a and 2b as a function of the torque Ce at the input of the reduction gear when the reduction gear is not manufactured by a method according to the invention. As can be seen in this figure, both intermediate gears transmit very different torques. FIG. 16b represents the evolution of the torque transmitted by each of the intermediate gears 2a and 2b as a function of the torque Ce at the input of the reduction gear when the reduction gear has been manufactured by a method according to one embodiment of the invention. As can be seen in this figure, the torque transmitted is thereby fairly distributed between both intermediate gears.

Of course, the invention is not limited to the embodiments described in reference to the figures and alternatives could be contemplated without departing from the scope of the invention. In particular, the method for manufacturing propeller reduction gears including more than two intermediate gears could be applied.

The invention claimed is:

1. A method for manufacturing a propeller reduction gear including:
    a casing including at least two front bearing seatings and two rear bearing seatings;
    an input gear;
    at least two intermediate gears, each intermediate gear including a first stage meshing with the input gear and a second stage, each intermediate gear being attached to the casing via at least one front bearing and one rear bearing, each front bearing being supported by one of the at least two front bearing seatings, each rear bearing being supported by one of the at least two rear bearing seatings;
    an output gear wheel meshing with the second stage of each of the at least two intermediate gears;
    the method comprising:
    (a) measuring manufacturing defects of the casing;
    (b) calculating a first angular play induced at each intermediate gear from the measured manufacturing defects;
    (c) estimating a second angular play induced at each intermediate gear by deformations of the casing upon transmitting a threshold torque by the reduction gear;
    (d) calculating a total angular play from the first angular play and the second angular play;
    (e) selecting two intermediate gears having a phasing difference compensating for the total angular play; and
    (f) manufacturing the propeller reduction gear using the selected two intermediate gears.

2. The method according to claim 1, wherein step (a) of measuring defects includes a step of measuring a real position of each bearing seating.

3. The method according to claim 2, wherein step (b) of calculating the first angular play includes:
    for each bearing seating, calculating a difference between the real position of the bearing seating and a reference position so as to obtain a bearing seating offset;
    for each intermediate gear:

calculating an offset of the intermediate gear from the bearing seating offsets supporting the bearings of the intermediate gear;

calculating the first angular play from the offset of the intermediate gear.

4. The method according to claim 1, wherein step (c) of estimating the second angular play includes:

estimating a displacement of each bearing seating upon transmitting a threshold torque by the reduction gear;

for each intermediate gear:

calculating a displacement of the first stage from the displacements of the bearing seatings supporting the bearings of this intermediate gear; and calculating a second angular play from the calculated displacements.

* * * * *